US009574362B2

(12) United States Patent
Zhu (10) Patent No.: US 9,574,362 B2
(45) Date of Patent: Feb. 21, 2017

(54) INFLATABLE POOL WITH DRAWING BOARD

(71) Applicant: Bestway Inflatables & Material Corp., Shanghai (CN)

(72) Inventor: Jiachen Zhu, Shanghai (CN)

(73) Assignee: Bestway Inflatables & Material Corp., Shanghai (CN)

( * ) Notice: Subject to any disclaimer, the term of this patent is extended or adjusted under 35 U.S.C. 154(b) by 485 days.

(21) Appl. No.: 14/017,446

(22) Filed: Sep. 4, 2013

(65) Prior Publication Data

US 2015/0059077 A1 Mar. 5, 2015

(51) Int. Cl.
| | | |
|---|---|---|
| *E04H 4/14* | (2006.01) | |
| *E04H 4/00* | (2006.01) | |
| *B43L 1/00* | (2006.01) | |
| *B29K 27/06* | (2006.01) | |
| *B29L 22/02* | (2006.01) | |

(52) U.S. Cl.
CPC . *E04H 4/14* (2013.01); *B43L 1/00* (2013.01); *E04H 4/0025* (2013.01); *B29K 2027/06* (2013.01); *B29L 2022/02* (2013.01); *Y10T 29/49826* (2015.01)

(58) Field of Classification Search
CPC ............... E04H 4/00; E04H 4/14; E04H 4/18; E04H 4/0025; B43L 1/00; B29L 2022/02
USPC .............................................. 4/494, 492, 588
See application file for complete search history.

(56) References Cited

U.S. PATENT DOCUMENTS

| | | | | | |
|---|---|---|---|---|---|
| 3,588,924 | A | * | 6/1971 | Goettl | E04H 4/00 52/169.7 |
| 4,901,997 | A | * | 2/1990 | Varga | E04H 4/00 472/126 |
| 5,081,936 | A | * | 1/1992 | Drieling | B60N 3/002 108/25 |
| 5,572,750 | A | * | 11/1996 | Johnston | E04H 4/14 4/494 |
| 5,603,129 | A | * | 2/1997 | Chou | E04H 4/0025 220/666 |
| 6,474,373 | B1 | * | 11/2002 | Sejnowski | E04H 4/0025 141/100 |
| 7,901,213 | B1 | * | 3/2011 | Beno | B43K 23/001 434/408 |
| 2005/0099054 | A1 | * | 5/2005 | McCarthy | A47C 15/006 297/452.41 |
| 2013/0167758 | A1 | * | 7/2013 | Zhu | A47B 37/04 108/50.18 |
| 2013/0318703 | A1 | * | 12/2013 | Berenson | A63G 21/18 4/494 |

* cited by examiner

*Primary Examiner* — J. Casimer Jacyna
(74) *Attorney, Agent, or Firm* — Uleses C. Henderson, Jr.; One LLP (57) ABSTRACT

An inflatable swimming pool includes a floor and a number of walls defining a pool interior configured to receive water. A drawing board is integrally formed or otherwise coupled to the pool and includes a selectively inflatable frame configured to securely hold a drawing surface configured to enable a user of the pool to draw or write on the drawing board while playing in the pool. A drawing utensil may be provided with the drawing board such as a water soluble crayon. A water sprayer assembly may be integrally formed with or coupled to the pool and include a port connectable to a water source and configured to deliver water from the water source to a sprayer element configured to spray water into the pool.

18 Claims, 8 Drawing Sheets

INFLATABLE POOL WITH DRAWING BOARD

BACKGROUND OF THE INVENTION

1. Field of the Invention

The invention generally relates generally to portable, inflatable swimming pools for children and, more particularly, to an inflatable swimming pool including a drawing board configured to enable a user of the swimming pool to draw and write on a drawing surface of the drawing board.

2. Discussion of the Related Art

During the warm summer months, children enjoy cooling off by swimming and playing in swimming pools and the like. For younger children such as toddlers and infants, portable inflatable swimming pools have long been one such way of cooling off. Such pools are easily inflatable and may be positioned at any number of locations within the child's yard such as in the shade, the sun, on the front or back lawn, etc. as may be desired. By allowing for the selective positioning of the pool, the supervising adult may better manage the child's exposure to the sun and provide a soft landing area around the pool should the child slip and fall. In addition, the pool may be selectively positioned so that a supervising adult may be able to easily monitor the child from any number of locations around the pool. Such pools may be filled with water to a desired level using a garden hose. In this way, the supervising adult may maintain the water level within the pool at a safe level dependent on the age(s) and/or size(s) of the child(ren) using the pool. After use, these pools may be deflated and folded for relatively compact storage until its next use. Pools of this kind are generally constructed from plastic, which is durable, inexpensive, and provides a soft contact surface should the child fall or bump into the walls of the pool.

Known inflatable pools are provided in a number of shapes, sizes, and themes. In addition, these pools may be additionally equipped with amusement features including slides and inflatable elements.

Still, despite these amusement features, the need still exists to provide an inflatable swimming pool including additional amusement features to prolong the child's amusement with the pool and provide an enhanced play experience.

SUMMARY OF THE INVENTION

In accordance with a first aspect of the invention, an inflatable and portable swimming pool includes a container comprising a floor and at least one side wall, which together define a pool interior within which water may be provided to a desired level. The at least one side wall may be selectively inflatable via an air valve. In one construction of the swimming pool, the floor may additionally be inflatable via the air valve or another air valve. A drawing board is coupled to the side wall and extends upwardly therefrom. The drawing board may include an inflatable frame that securely holds a drawing surface therebetween. The drawing surface is configured for drawing or writing on by a user of the swimming pool with an erasable drawing utensil such as, for example, a water soluble crayon. The drawing surface is configured to be easily and selectively erasable using water and a towel for repeated usage. In this manner, the swimming pool of the present construction is configured to provide the users thereof with additional amusement by providing a drawing board for drawing and writing on while the users of the swimming pool cool off in the water within the pool.

In accordance with another aspect of the invention, a water sprayer assembly may be provided. The water sprayer assembly may be integrally formed with the at least one side wall and extend upwardly therefrom. The water sprayer may be in any number of shapes and sizes. Moreover, the water sprayer may be constructed in the form of an amusing shape such as an animal or any other desired form. The water sprayer assembly may include a port that is selectively coupleable to a water source such as, e.g., a hose. The port may be in communication with a sprayer element, which may comprise a plurality of spaced apertures configured to emit water delivered from the hose to the port therethrough. At least a portion of the water sprayer assembly may be inflatable.

In accordance with yet another aspect of the invention, the container may be formed from a PVC sheet. The PVC sheet may be thermoformed using high frequency welding to form the floor and at least one side wall.

In still another aspect of the invention, the at least one side wall and the frame may be integrally formed with one another. The water sprayer assembly may also be integrally formed with the at least one side wall.

According to another aspect of the invention, the at least one side wall is circumferentially shaped. According to still another aspect of the invention, the at least one side wall comprises a plurality of integrally formed side walls. The plurality of integrally formed side walls may be provided in any number of shapes and configurations including rectangular, square, or other polygonal shape.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

With reference now to FIGS. 1-8, a portable inflatable swimming pool is shown generally at 20. The pool 20 may be constructed from a relatively flexible plastic material. In one construction of the pool 20, the pool 20 is constructed from a sheet of PVC (polyvinyl chloride), which is then thermoformed via high-frequency welding to form the particular shape and characteristics of the pool 20. Understandably, the pool 20 may be constructed from any number of similarly suitable methods and materials.

The pool 20 includes a pair of opposing end walls 22 and 24 and a pair of opposing side walls 26 and 28 interconnected between the end walls 22 and 24. A floor 30 is coupled to the lower ends of the end walls 22 and 24 and side walls 26 and 28, which together define a pool interior 32 configured to receive water for filling the pool 20. The floor 30 may be generally formed from a relatively thin sheet of material and adjoined to the respective walls 22-28 by conventional means. As will be described, the walls 22-28 are configured to be selectively inflated and deflated as desired while the floor 30 may be configured to remain generally flat to safely support users of the pool 20.

While the pool 20 is shown having a generally rectangular construction, it is understood that any number of alternative shapes could be employed in practicing the invention. For example, the pool 20 could be circular, oval, or any polygonal shape or the like. For instance, the pool 20 could be constructed with a single, circumferential wall integrally or otherwise coupled to the floor 30 to define the pool interior 32.

The end walls 22 and 24 and side walls 26 and 28 include an upwardly facing upper surface 34, an inner side surface 36, an outer side surface 38 and a lower surface 39 supporting the respective walls 22-28 on the ground surface.

As illustrated, the upper surface 34 includes an air valve 40, which may be used to selectively inflate and deflate the walls 22-28, but it is to be understood that the air valve 40 may be provided on any portion of the pool 20 so long as it is capable of inflating the walls 22-28. The air valve 40 is of standard construction and therefore will not be described in further detail. In one construction of the pool 20, the floor 30 may be selectively inflatable. In this construction, the floor 30 may be inflatable using the air 30 valve 40 or may be inflatable via another air valve of similar construction located on the pool 20 and in fluid communication therewith to enable inflation of the floor 30.

The pool 20 may further include a drawing board 42 coupled to one of the walls 22-28. As illustrated, the drawing board 42 is integrally formed with the upper surface 34 of the end wall 22, but it is to be understood that the drawing board 42 may be integrally formed with any of the walls 22-28 or may be formed separately and coupled to one of the walls 22-28 by any number of conventional attachment mechanisms. In addition, the drawing board 42 may be mounted elsewhere on any one of the walls 22-28 other than the upper surface 34 as is illustrated as may be desired. Moreover, while the pool 20 is shown having a single drawing board 42, it is to be understood that one or more additional drawing boards may be provided therewith. Moreover, while the drawing board 42 is shown as being generally rectangular, it is to be understood that the drawing board 42 may be provided in any number of varying shapes, sizes, and configurations in keeping with the spirit of the present invention.

Figure 1:
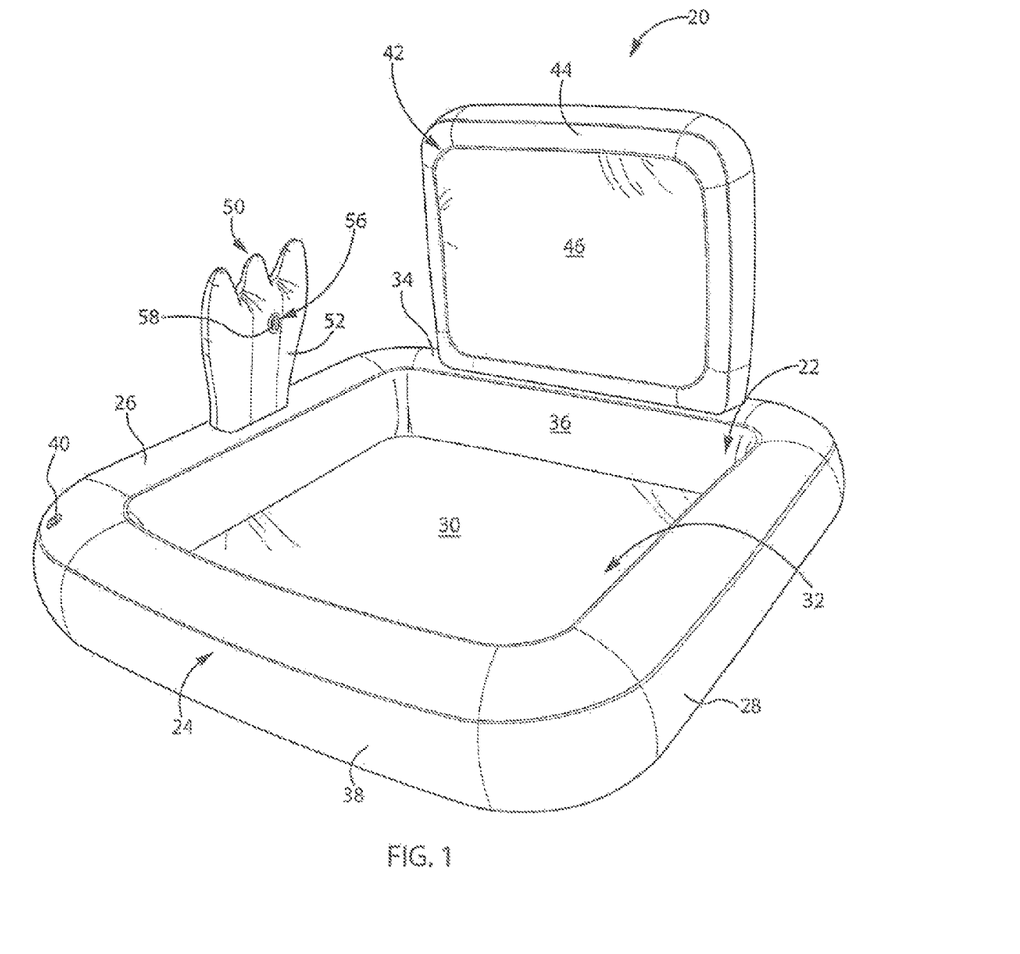
FIG. 1 is an isometric view of an inflatable swimming pool in accordance with the present invention.
Figure 2:
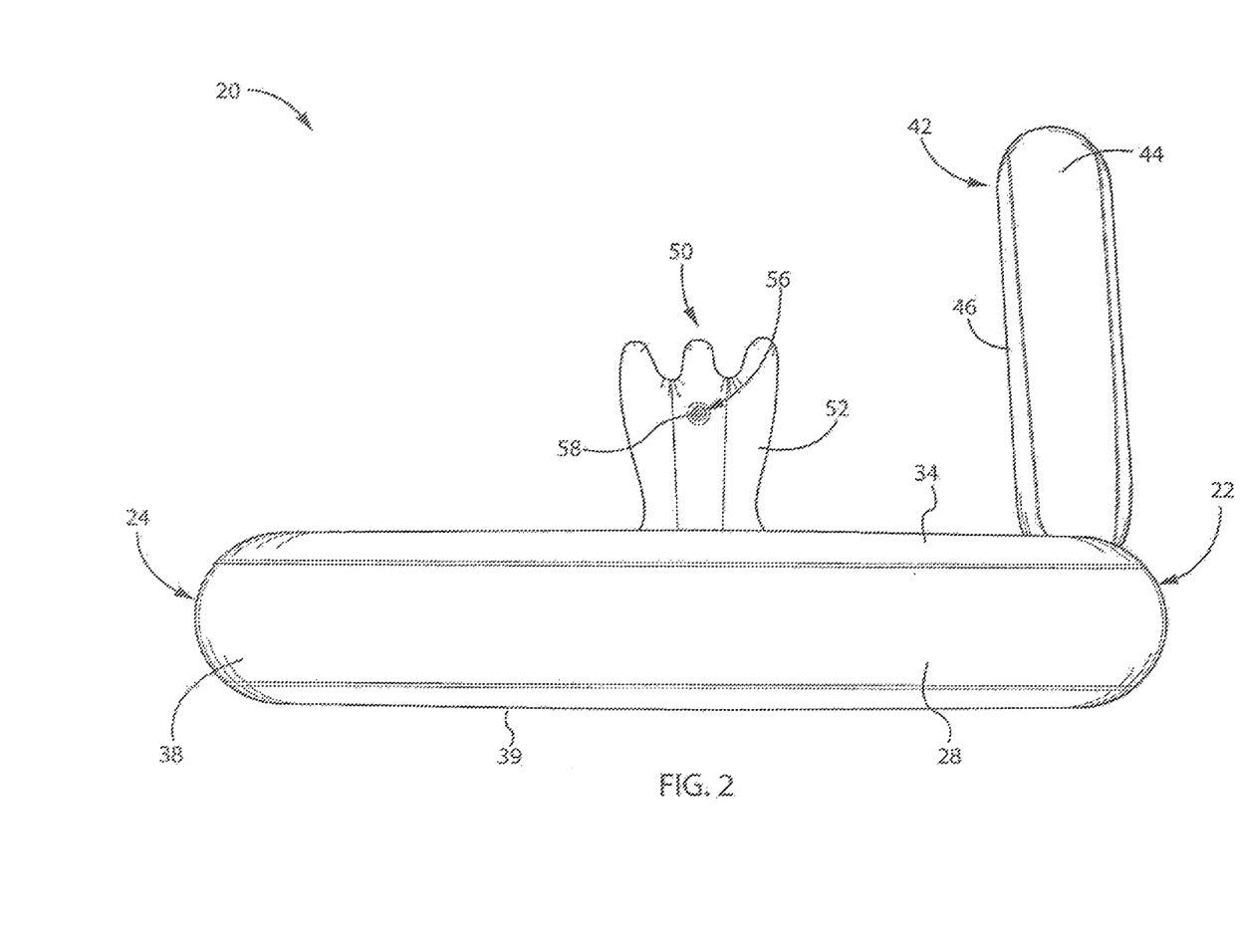
FIG. 2 is a first side elevation view of the inflatable swimming pool of FIG. 1.
Figure 8:
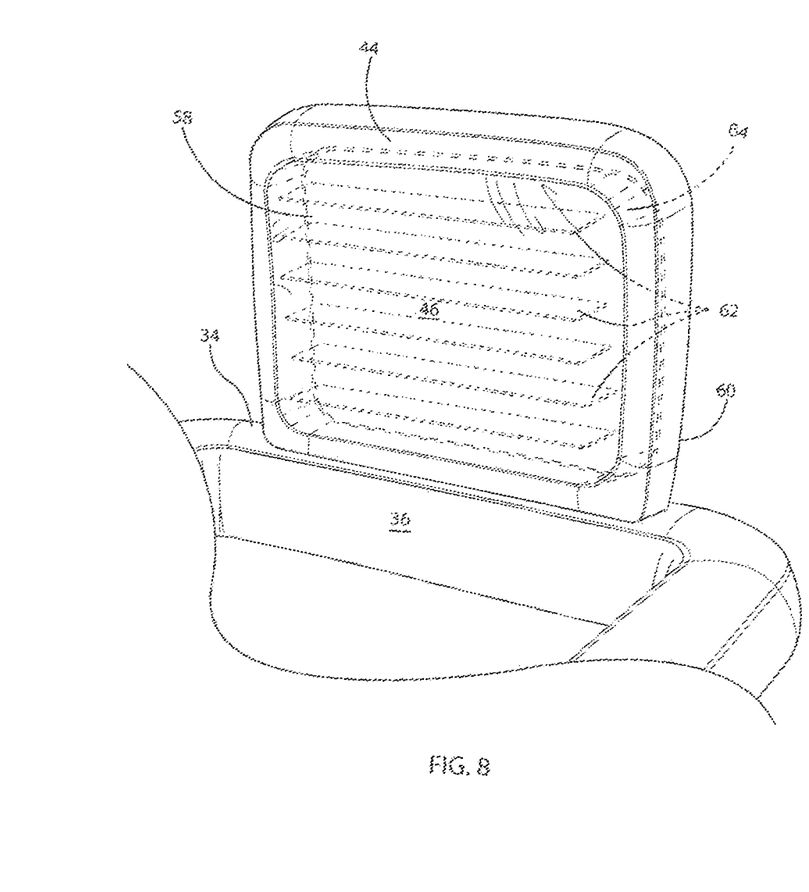
FIG. 8 is a partial isometric view of the inflatable swimming pool of FIG. 1, showing a drawing board thereof in additional detail.

The drawing board 42 includes a frame 44 configured to securely support a drawing surface 46 therebetween. In particular, the frame 44 may include a number of edges 48 to which the drawing surface 46 is attached to the frame 44. The frame 44 may be inflatable via a conventional air valve 48. The drawing surface 46 may be constructed from a material configured to allow for writing and drawing thereon with washable drawing utensils such as, e.g., water soluble crayons or the like. As may be desired, a drawing utensil (not shown) may be mounted or coupled to the drawing board 42 for selective use therewith. The drawing surface 46 may be configured to be selectively erased or cleaned using water and a towel or the like for repeated use thereof.

With particular reference now to FIG. 8, a construction of the drawing board 42 is shown in additional detail. The drawing board 42 includes a front layer 58, a back layer 60 and a number of beams 62 provided there between. In particular, the beams 62 are provided within an interior defined by the front layer 58 in the back layer 60 and are attached to the interior surfaces thereof. The beams 62 may be provided in the form of I-beams or any other similarly suitable construction. A support member 64 may additionally be provided around a perimeter of the interior of drawing board 44. The support member 64 may be configured to be coupled to the beams 62 and support the beams 62 within the interior defined by the front layer 58 and the back layer 60. In addition, the support member 64 provides additional support around the edges of the drawing surface 46. The support member 64 may be provided from a single piece of material integrally formed to provide support to the drawing board 44. In the alternative, the support member 64 may comprise a number of segments joined together by conventional joining process of the kind generally known in the art. The front layer 58, back layer 60, and beams 62 may be constructed of any suitable material as previously described herein. The beams 62 provide the drawing board 42 with additional reinforcement to better enable users thereof to draw on the drawing board 42. Understandably, the beams 62 could be replaced by a single internal structure configured to operate in a similar such manner.

The pool 20 may additionally include a sprayer assembly 50 integrally formed with or otherwise coupled to one of the walls 22-28. As illustrated, the sprayer assembly 50 is integrally formed with the side wall 26, but it is to be understood that the sprayer assembly 50 may be provided on any of the walls 22-28. Further, the sprayer assembly 50 may be formed separately from the rest of the pool 20 and be configured to be coupled to the pool 20 in a conventional manner. The sprayer assembly 50 is shown as extending upwardly from the upper surface 36 of the wall 26, but it is to be understood that the sprayer assembly 50 may be mounted on and arranged on any portion of the pool 20 so long as it is capable of carrying out the spraying function thereof as will be described in additional detail hereinafter.

The sprayer assembly 50 includes a support element 52, which may be in the form of an amusing or entertaining design. As illustrated, the support element 52 is in the form of a set of three large crayons, but understandably, the support element 52 could take on any number of configurations in keeping with the invention. The support element 52 may be configured to be selectively inflatable via the air valve 40 or via a separate air valve (not shown) provided thereon.

Figure 3:
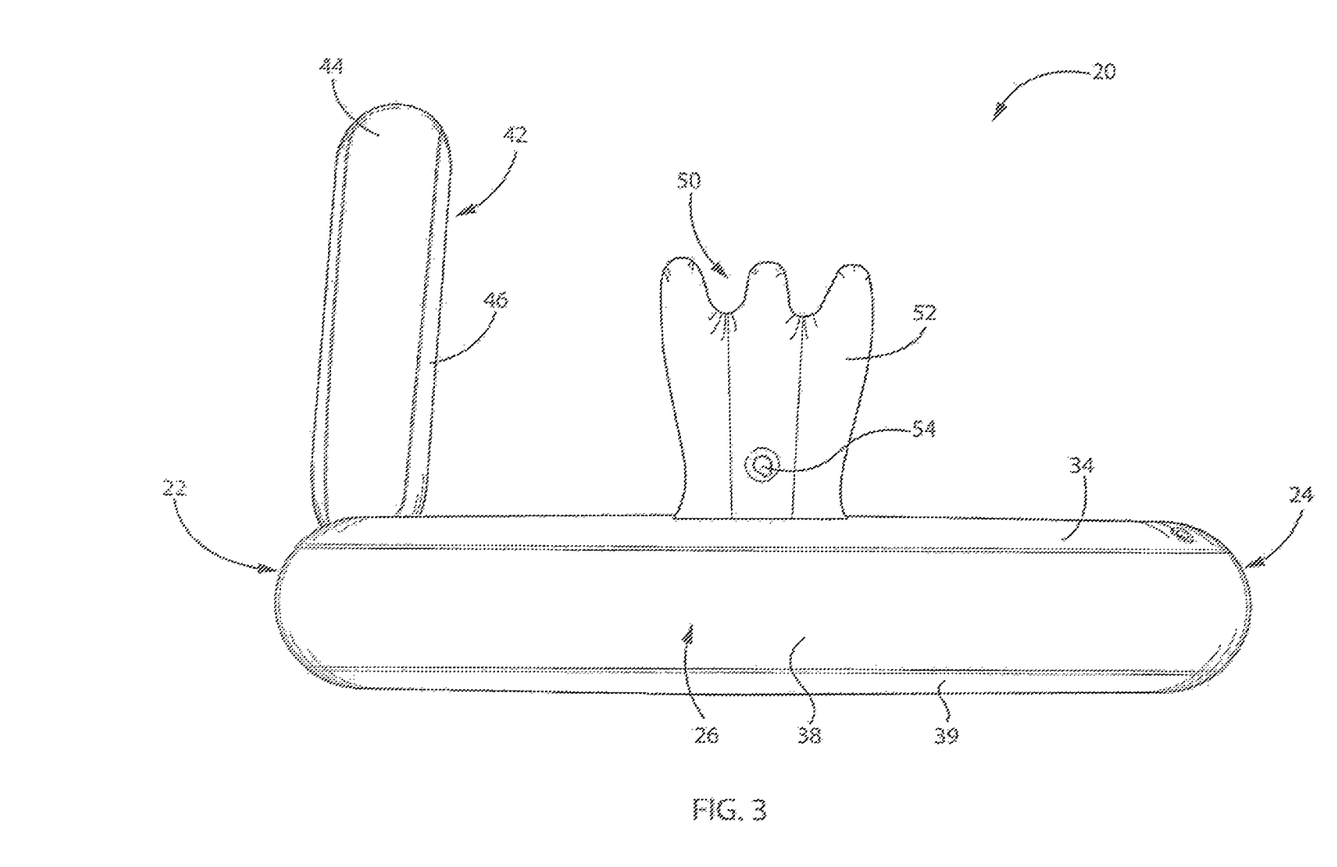
FIG. 3 is an opposite side elevation view of the inflatable swimming pool of FIG. 2.
Figure 4:
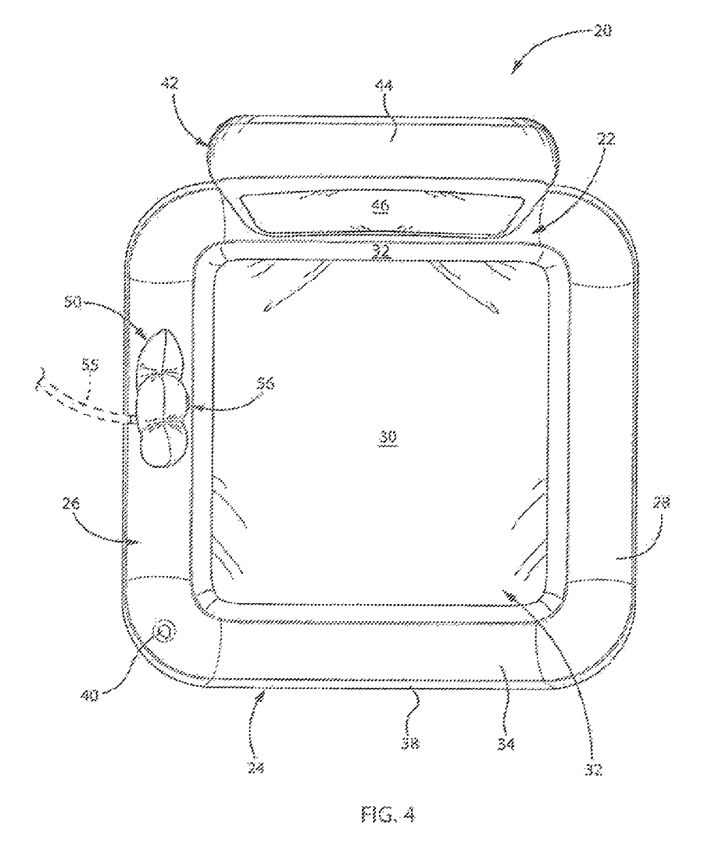
FIG. 4 is a top plan view of the inflatable swimming pool of FIG. 1.
Figure 5:
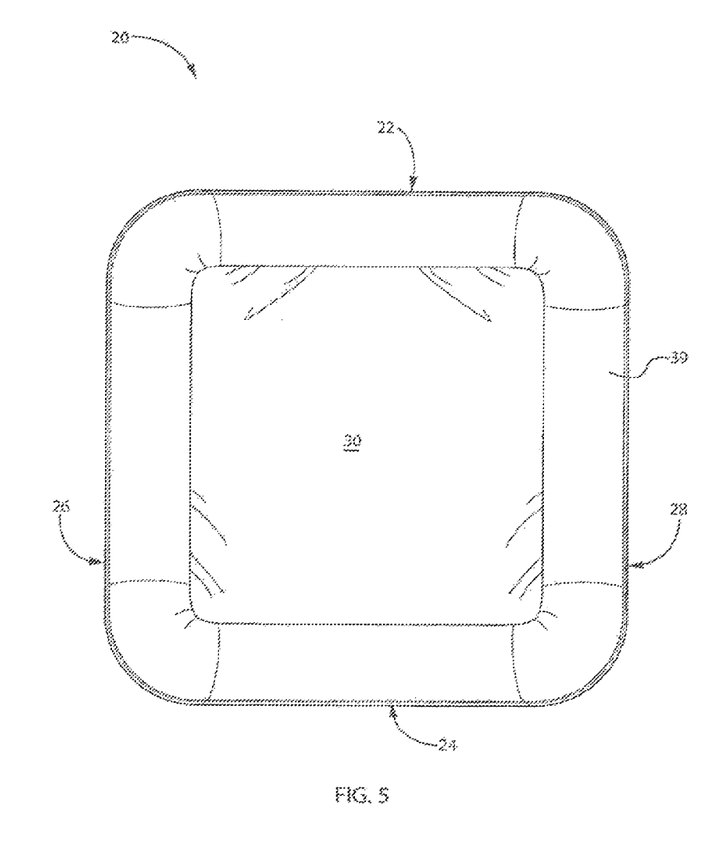
FIG. 5 is a bottom plan view of the inflatable swimming pool of FIG. 1.
Figure 6:
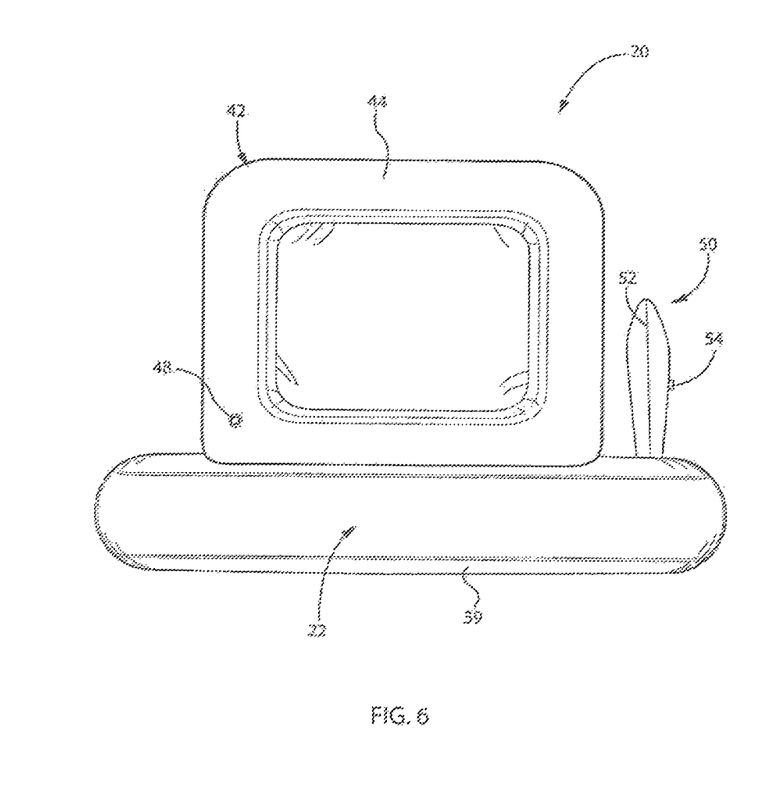
FIG. 6 is a rear elevation view of the inflatable swimming pool of FIG. 1.
Figure 7:
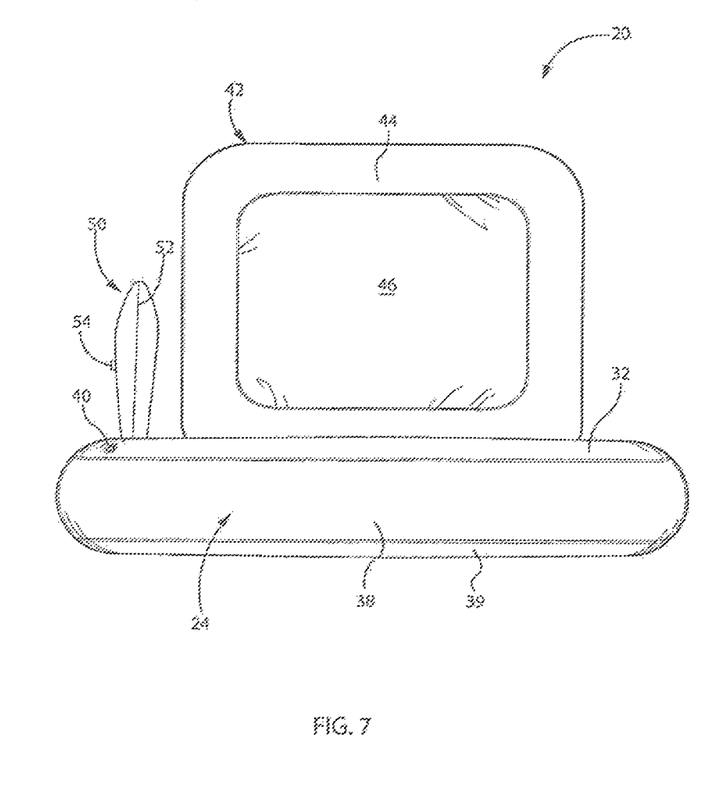
FIG. 7 is a front elevation view of the inflatable swimming pool of FIG. 1.

With particular reference now to FIG. 3, the sprayer assembly 50 comprises a port 54 provided on a rear side of the support element 52, although it is to be understood that the port 54 may be provided elsewhere on the sprayer assembly 50. The port 54 is sized, shaped, and configured to be securely coupled to a water source such as a conventional garden hose 55. The port 54 is in fluid communication with a sprayer element 56 provided on a front side of the support element 52, wherein the sprayer element 56 is configured to deliver water delivered from the water source to the port 54 to the pool interior 32. The sprayer element 56 may be provided in a number of configurations. As illustrated, the sprayer element 56 comprises a plurality of apertures 58 through which the water is delivered to the pool interior 32.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

I claim:

1. A swimming pool comprising:
    a container comprising a floor and at least one wall defining a pool interior, wherein the at least one wall is inflatable; and
    at least one drawing board coupled to the container and configured for drawing thereon, the drawing board including an air inflatable frame configured to securely support a drawing surface therebetween, a front layer and a back layer defining an air-fillable interior cavity therebetween, wherein at least one internal structure is provided in the interior cavity coupling the back layer to the front layer.

2. The swimming pool of claim 1, further comprising a sprayer assembly coupled to the container and selectively connectable with a water source to spray water into the pool interior.

3. The swimming pool of claim 1, further comprising a drawing utensil coupled to the swimming pool and configured for writing on the drawing board.

4. The swimming pool of claim 3, wherein the drawing utensil is a water soluble crayon.

5. The swimming pool of claim 1, wherein the swimming pool is constructed from a PVC sheet and thermoformed through high-frequency welding.

6. The swimming pool of claim 1, wherein the floor is inflatable.

7. The swimming pool of claim 1, wherein the at least one wall is circumferentially shaped.

8. The swimming pool of claim 1, wherein the at least one wall comprises a plurality of sidewalls arranged in a polygonal shape.

9. The swimming pool of claim 1, wherein the at least one wall defines an upper surface and wherein the drawing board extends upwardly from the upper surface.

10. The swimming pool of claim 1, wherein the container and the drawing board are integrally formed.

11. An inflatable swimming pool comprising:
    a container including a floor and at least one inflatable wall coupled to the floor to define a pool interior configured to be filled with water;
    at least one drawing board coupled to the container and comprising an air inflatable frame and drawing surface secured within the inflatable frame, a front layer and a back layer defining an air-fillable interior cavity therebetween, wherein at least one internal structure is provided in the interior cavity coupling the back layer to the front layer.

12. The inflatable swimming pool of claim 11, further comprising a sprayer assembly coupled and extending upwardly from an upper surface of the at least one inflatable wall, wherein the sprayer assembly comprises a port selectively coupleable to a water source and in communication with a sprayer element configured to spray the pool interior with water.

13. The inflatable swimming pool of claim 12, wherein the sprayer assembly is integrally formed with the at least one wall.

14. The inflatable swimming pool of claim 11, wherein the at least one inflatable wall comprises a plurality of walls integrally formed with one another to define the pool interior with the floor.

15. A method of constructing an inflatable swimming pool, the method comprising the steps of:
    coupling a floor to at least one wall to define a pool interior configured to hold water, wherein the at least one wall is configured to be selectively inflatable;
    attaching a drawing board to the at least one wall, wherein the drawing board is configured for allowing a user to draw on a drawing surface thereof, the drawing board including an air inflatable frame configured to securely hold the drawing surface therebetween, a front layer and a back layer defining an air-fillable interior cavity therebetween, wherein at least one internal structure is provided in the interior cavity coupling the back layer to the front layer.

16. The method of claim 15, further comprising the step of mounting a sprayer assembly to the at least one wall, wherein the sprayer assembly comprises a port selectively coupleable to a water source and in communication with a sprayer element configured to emit water from the water source to the pool interior.

17. The method of claim 15, further comprising the step of thermoforming a PVC sheet to form the floor and at least one wall.

18. The method of claim 17, wherein the step of thermoforming is done by high frequency welding.

* * * * *